United States Patent
Soomro

(10) Patent No.: US 7,352,728 B2
(45) Date of Patent: Apr. 1, 2008

(54) FAST CHANNEL SWITCHING SCHEME FOR IEEE 802.11 WLANS

(75) Inventor: Amjad Soomro, Hopewell Junction, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1057 days.

(21) Appl. No.: 10/288,098

(22) Filed: Nov. 5, 2002

(65) Prior Publication Data

US 2003/0171116 A1 Sep. 11, 2003

Related U.S. Application Data

(60) Provisional application No. 60/362,519, filed on Mar. 7, 2002.

(51) Int. Cl.
  *H04Q 7/24* (2006.01)
  *H04Q 7/20* (2006.01)
  *H04J 3/16* (2006.01)

(52) U.S. Cl. .................... 370/338; 370/437; 455/452.1

(58) Field of Classification Search ................. 455/95, 455/452.1; 370/338, 437
See application file for complete search history.

(56) References Cited

U.S. PATENT DOCUMENTS

| | | | | |
|---|---|---|---|---|
| 6,594,272 B1 * | 7/2003 | Ketcham et al. | ............. | 370/428 |
| 6,934,752 B1 * | 8/2005 | Gubbi | ......................... | 709/225 |
| 7,120,138 B2 * | 10/2006 | Soomro et al. | ............. | 370/343 |
| 2002/0060995 A1 * | 5/2002 | Cervello et al. | ............. | 370/332 |
| 2002/0188723 A1 * | 12/2002 | Choi et al. | ................... | 709/225 |
| 2003/0012217 A1 * | 1/2003 | Andersson et al. | ......... | 370/437 |
| 2003/0040319 A1 * | 2/2003 | Hansen et al. | ............... | 455/452 |

FOREIGN PATENT DOCUMENTS

JP 08307644 A * 11/1996

OTHER PUBLICATIONS

Electronic Translation JP 08-307644.*
Cervello et al: "Dynamic Channel SDelection (DCS) Scheme for 802.11" IEEE 802.11-00/195, Jul. 12, 2000, pp. 1-7.
Kerry et al: "Liaison Statement On The Compatibility Between IEEE 802.11A And Radars In The Radiolocation And Radionavigation Service In The 5250-5350 MHZ And 5470-5725 MHZ Bands" Jan. 17, 2001, pp. 1-6.
Choi et al: "Transmitter Power Control (TPC) and Dynamic Frequency Selection (DFS) Joint Proposal for 802.11h WLAN" IEEE 802.11-01/169, Mar. 12, 2001, pp. 1-16.

* cited by examiner

*Primary Examiner*—William Trost
*Assistant Examiner*—Marivelisse Santiago-Cordero
(74) *Attorney, Agent, or Firm*—Larry Liberchuk

(57) ABSTRACT

Disclosed is a method and system for switching at least one wireless node located within the coverage area of a basic-service set (BSS) or infrastructure-basic-service set (IBSS) in a wireless-local-area network (WLAN) from a first communication channel to a second communication channel. The method includes: determining whether the second communication channel to be used by at least one wireless node is needed; broadcasting by a source node a management frame to at least one of the wireless node when it is determined that the second communication channel is needed, the management frame including a channel-switch time and a second communication channel identifier; and switching, at least one wireless node receiving the management frame, from the first communication channel to a second communication channel within a countdown time corresponding to the channel switch time, wherein the channel-switch time is less than a beacon interval.

14 Claims, 2 Drawing Sheets

FAST CHANNEL SWITCHING SCHEME FOR IEEE 802.11 WLANS

CROSS REFERENCE TO RELATED APPLICATION

The application claims the benefits of U.S. Provisional Application Ser. No. 60/362,519 filed on Mar. 7, 2002, the teachings of which are incorporated herein by reference.

BACKGROUND OF THE INVENTION

1. Field of the Invention

The present invention relates to a fast channel-switching mechanism in an 802.11(h) wireless-local-area network (WLAN), wherein channel switching is performed independent from the beacon-interval period.

2. Discussion of the Related Art

The medium-access-control (MAC) layer and physical (PHY) layer characteristics for wireless-local-area networks are specified in the IEEE 802.11(h) standard, which is defined in International Standard ISO/IEC 8802-111, "Information Technology-Telecommunications and information exchange between systems—Local and metropolitan area networks—Specific Requirements, Part 11: Wireless LAN Medium Access Control (MAC) and Physical (PHY) specifications," 1999 Edition, which is hereby incorporated by reference in its entirety. The standard provides a mechanism for the announcement of a channel switch performed at the MAC layer. Specifically, the MAC layer provides a channel-switch announcement element that is used by an AP (Access Point) in a BSS network or a STA in an IBSS network to announce when it is changing to a new channel and the channel number of the new channel. The channel-switch-announcement element includes a "channel switch count" field which is set equal to the number of target-beacon-transmission times (TBTT's) which must transpire before the network is switched to a new channel.

A drawback of performing a channel switch in accordance with the IEEE 802.11 standard is that in certain cases there could be a considerable amount of latency, i.e., delay, in having to wait for at least one or multiple TBTT's to transpire before a channel switch is permitted. Furthermore, this latency may not satisfy the DFS (Dynamic Frequency Selection) requirement for WLANS operating in the 5 GHz band in some regulatory domains in Europe. Specifically, the DFS requirement mandates that a WLAN avoid interfering with other co-located systems, such as radar systems performing mission-critical functions. To avoid such interference, all communications must be halted in the bands where other primary users are detected within a specified time. Halting communications within the specified time may not be achievable in light of the described latency.

Accordingly, there is a need for a channel-switching scheme that can be incorporated into the IEEE 802.11 standard, at the MAC layer, which overcomes the described channel-switching latency and that also satisfies the DFS regulatory requirement imposed on WLANS operating in the 5 GHz band in Europe.

SUMMARY OF THE INVENTION

The present invention is thus directed to a fast channel-switching method and system in a wireless-local-area network (WLAN), for performing "fast channel switching" so as to minimize channel-switching latency and thereby prevent interference with the operations of other co-located systems, such as radar systems performing mission-critical functions, particularly in the 5 GHz band. It should be noted that while the invention finds suitable application for use with WLANS operating in the 5 GHz band, it is equally applicable for use in other bands such as the 2.4 GHz band.

The present invention provides a number of embodiments for performing fast channel switching in a WLAN. In all embodiments, the source node could be an AP in a BSS or a STA in an IBSS.

In accordance with an embodiment of the invention, a "fast" channel mode is disclosed which is a method for performing fast channel switching for a plurality of stations (STAs) located within the coverage area of a basic-service set (BSS) or an independent-basic-service set (IBSS). In accordance with the "fast" channel mode, all STAs are switched from a current channel of operation in the BSS or IBSS to an announced channel of operation in a time period, which is specified in fine granular time divisions (in microseconds). This permits channel switching to occur in less than a single beacon period. The method includes the steps of: determining whether a new channel to be used by a plurality of STAs is needed; broadcasting, by a source node, a channel-switch-announcement element (CSAE), the CSAE includes an announced channel and a channel-switch time; and switching the STAs to the announced channel prior to the expiration of the channel-switch time, which is independent of the beacon interval.

According to a feature of this embodiment, by specifying a channel-switch time with a finer granularity than a beacon interval, a channel-switch latency of any desired value can be achieved. Furthermore, in accordance with another feature of this embodiment, transmission exchanges from all STAs are allowed to continue in the current channel until the expiration of the channel-switch time.

In a further embodiment, the present invention provides another method for performing fast channel switching for a plurality of stations (STAs) located within the coverage area of a basic-service set (BSS) or an independent-basic-service set (IBSS), referred to herein as the "quiet" channel mode. In the "quiet" channel mode, a method is provided for quickly halting all further transmissions in a current channel of operation upon receipt of a CSAE from a source node (i.e., an AP in a BSS or a STA in an IBSS) including a "quiet" bit set. The method includes the steps of: determining whether a new channel to be used by a plurality of STAs is needed; broadcasting a CSAE by the source node, the CSAE including an announced channel and a channel-switch time; upon receipt of the CSAE at the STAs, halting all further frame exchanges in the current channel; and switching all STAs to the new channel in a time period defined by the channel-switch time.

According to a feature of this embodiment, the time in which a switch occurs to the announced channel may be specified in beacon intervals. In contrast to the previous embodiment in which switching occurred independent of the beacon interval, the channel switch time is allowed to be specified in beacon intervals. Such specification enables longer switching time to allow the network first to scan the other channels in the network for their channel quality and the possible existence of pre-existing primary users in the other channels. Yet, regulatory requirements are satisfied due to the fact that no further normal frame exchanges are allowed in the current channel.

According to yet another preferred embodiment, an enhancement to the previous embodiment is disclosed, referred to herein as the "repeat" mode. The "repeat" mode is an enhancement to the "quiet" mode of the previous embodiment. The "repeat" mode takes into consideration the possibility that one or more STAs that did not hear the CSAE broadcast or transmitted by the source node in the "quiet" mode to quiet the channel. As such, those STAs that do not hear the CSAE broadcast by the source node will continue to erroneously transmit MAC frames over the network. To prevent these erroneous transmissions from continuing in the current channel, it is contemplated that any STA that receives an erroneous MAC frame is permitted to retransmit the CSAE one time before the announced channel switch time expires. In this manner, it is believed that the CSAE re-broadcasted from an STA will be heard by those STAs that did not hear the initially-broadcasted CSAE from the source node. If, while performing a random backoff, a CSAE belonging to the same BSS or IBSS is received, the transmission shall not be done. This resolves contention by multiple STAs to retransmit CSAEs.

Another aspect of the invention provides a system for performing "fast channel switching" in a WLAN. The system includes means for determining whether a new channel to be used by a plurality of STAs is needed; means for broadcasting, by a source node, a channel-switch-announcement element including a channel switch time having a value independent of the beacon interval; and means for switching the STAs to a new channel of operation at the expiration of the time specified by the announced channel-switch time.

The system may further include in alternate embodiments means for halting all further frame exchanges in the current channel upon receipt of the channel-switch-announcement element at the STAs; and means for re-transmitting the channel-switch-announcement element by an STA in the case where one or more STAs do not hear the initially-transmitted CSAE broadcast by the source node.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE PREFERRED EMBODIMENTS

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

The present invention relates to a fast-channel-switching scheme for reducing channel-switching latency to prevent interference with the operations of other co-located systems, such as radar systems performing mission-critical functions in the 5 GHz band. It should be apparent to those skilled in the art that this invention can be easily extended to other frequency bands, such as 2.4 GHz, using different physical-layer specifications, such as the IEEE 802.11b PHY specification.

Figure 1:
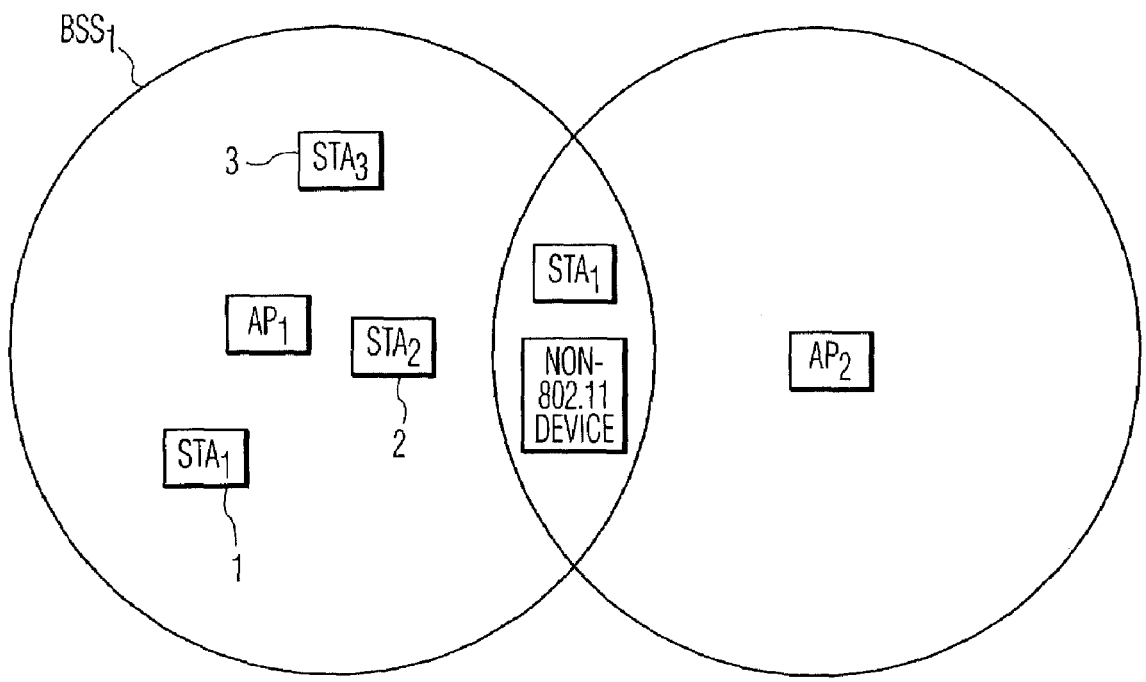
FIG. 1 illustrates the architecture of a wireless-communication system whereto embodiments of the present invention are to be applied.

FIG. 1 illustrates a representative network whereto embodiments of the present invention are to be applied. According to the principle of the invention, there is provided a fast-channel-switching scheme enabling an access point (AP) in a BSS network, as shown, (or a STA in an IBSS network) so as to minimize channel-switching latency and thereby prevent interference with the operations of other co-located systems, such as radar systems performing mission-critical functions, particularly in the 5 GHz band. It should be noted that the network shown in FIG. 1 is small for the purpose of illustration. In practice, most networks would include a much larger number of mobile STAs. It is also noted that while FIG. 1 and the following description are provided with reference to a BSS network, the principles of the invention apply equally to an IBSS network.

The present invention has application to a wireless-local-area network (WLAN) by enabling the AP to quickly initiate a channel switch or a channel quieting for all or some stations (STAs) associated with its BSS in response to interference from other non-associated users. For example, $STA_3$ of $BSS_1$ may be in an overlapping region with a neighboring $BSS_2$, thus experiencing contentions from the $STA_2$ in the neighboring $BSS_2$. Alternatively, $STA_3$ may experience interference from a nearby non-802.11-compliant device belonging to other primary users such as satellites or radar systems. To this end, the present invention introduces changes to the 802.11 MAC specification that would enable either a rapid transition to a new frequency channel or a rapid quieting of a current frequency channel. These changes would facilitate meeting the requirements imposed by the European Radio Communications Committee (ERC), and they would enhance the performance of an 802.11 WLAN operation in the 5 GHz band or other bands, for example, 2.4 GHz. It should be apparent to those skilled in the art that this invention can be easily extended to other frequency bands, such as 2.4 GHz, using different physical-layer specifications, such as an IEEE 802.11b PHY specification.

Figure 2:
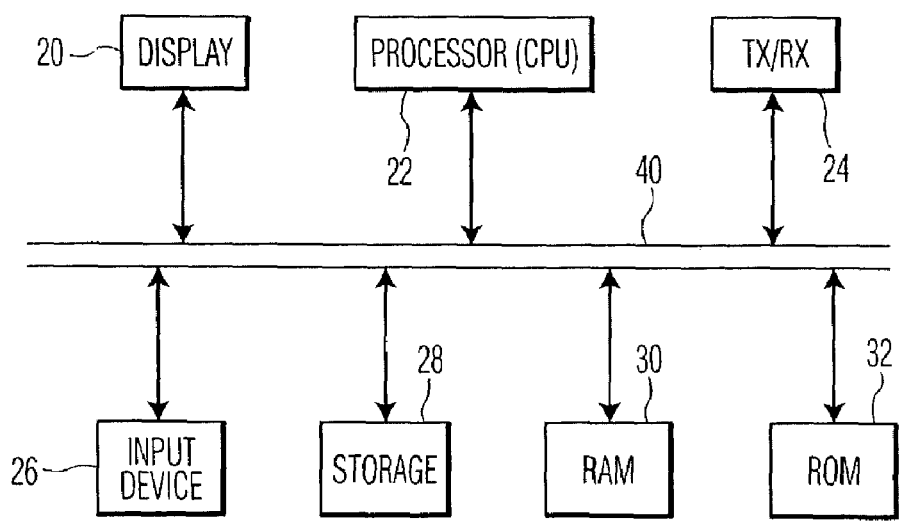
FIG. 2 illustrates a simplified block diagram of an access point (AP) and each station (STA) within a particular basic-service set (BSS) according to the embodiment of the present invention.

Referring to FIG. 2, the AP and each STA within the WLAN shown in FIG. 1 may include a system with an architecture that is illustrated in the block diagram of FIG. 2. Both the AP and STA may include a display 20, a CPU 22, a transmitter/receiver (Tx/Rx) 24, an input device 26, a storage module 28, a random-access memory (RAM) 30, a read-only memory (32), and a common bus 40. Although the description may refer to terms commonly used in describing particular computer systems, the description and concepts equally apply to other processing systems, including systems having architectures dissimilar to that shown in FIG. 2. The transmitter/receiver 24 is coupled to an antenna (not shown) to transmit desired data and its receiver converts received signals into corresponding digital data. The CPU 22 operates under the control of an operating system contained in the ROM 32 and utilizes RAM 30 to perform the frequency selection within a wireless-local-area network (WLAN), by enabling the AP to provide a new channel or wireless link for some or all stations (STAs) associated with its BSS.

Prior to describing the various embodiments for performing fast channel switching according to the present invention, one implementation for selecting the various embodiments will be described in the context of a modification to the Channel-Switch-Announcement Element at the MAC layer. One way of implementing the various "fast channel" switching embodiments of the invention is to modify the channel-switch-announcement element (CSAE), which is one type of information element which may be included as the component of a management frame to provide services on a wireless network. As is well known in the art, a CSAE defines a new frequency channel and when to switch to it, which is defined in IEEE Standard P802.11/D0.1, Draft Supplement to Standard for Telecommunications and Information Exchange Between Systems, hereby incorporated by reference in its entirety.

Figure 3A:
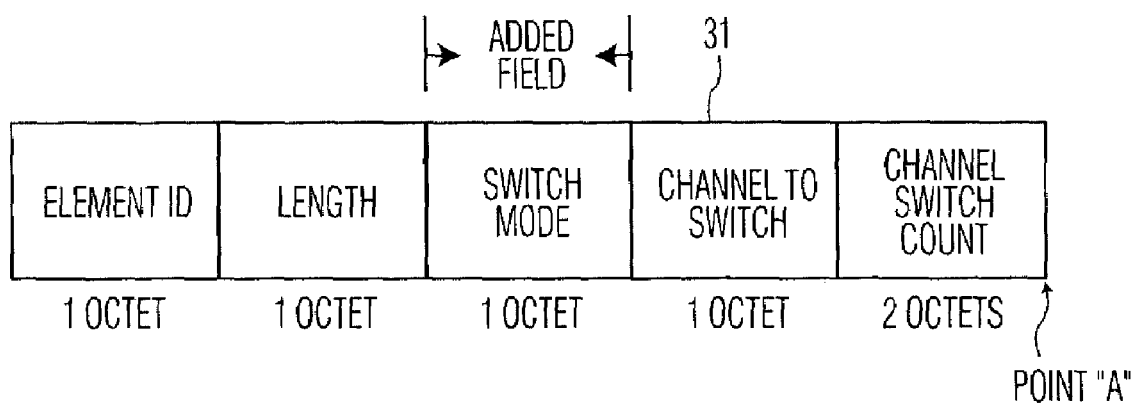
FIG. 3(a) illustrates the format of a channel-switch-announcement-element for transmitting information from an AP to each station (STA) according to an embodiment of the present invention; and, FIG. 3(b) illustrates the format of the Switch-Mode subfield of the channel-switch-announcement element of FIG. 3(a) according to an embodiment of the present invention.

Referring to FIG. 3a, a format for a channel-switch-announcement element (CSAE) 31, modified in accordance with the invention is shown. The modified CSAE 31 is shown to contain two conventional fields and an added field, i.e., the "switch mode" field in addition to the "Element ID" and "Length" fields. The conventional fields include: a "channel to switch" field which indicates the number of frequency channel to move to. There is also shown a "channel switch count" which conventionally indicates how many beacons (including the current beacon frame) shall appear before the channel switch of the BSS occurs. However, in accordance with the embodiments described herein, the "channel switch count" has an alternative representation, namely, the "channel switch count," as described herein, represents a countdown time in microseconds, at the expiration of which the STAs must switch from a current channel of operation to the announced channel. The added field is a "switch mode" field, which is shown as a single octet for selecting one of the embodiments to be described below.

Figure 3B:
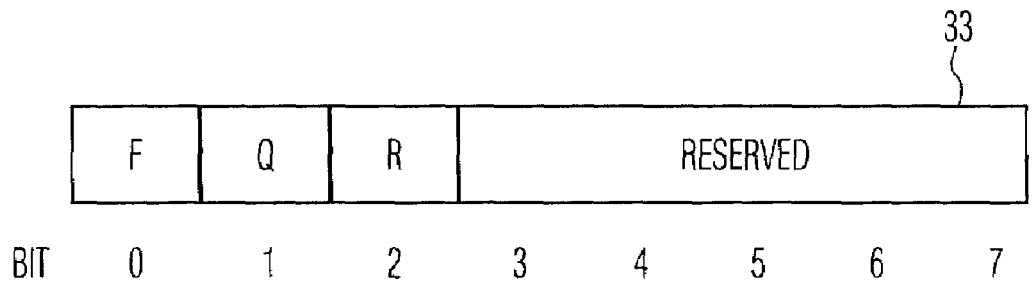

FIG. 3b illustrates one possible implementation for the "switch mode" byte of FIG. 3a in which bit fields of the single octet are used for selecting the various embodiments. As shown, bit-field zero is used for selecting the "fast" mode of operation, bit-field one is used for selecting the "quiet" mode of operation and bit-field two is used for selecting the "repeat" mode of operation. It is to be appreciated, however, that the invention is not limited to this particular hardware or software implementation and may use any appropriate technique for implementing the functionality of the embodiments disclosed herein.

Each of the embodiments is described now.

In one embodiment of the invention, a "fast" mode of operation is described in which the STAs are all quickly switched from a current (first) channel to a new (second) channel, at the expiration of the "channel-switch-count" time, independent of the beacon-interval period.

With continued reference to FIG. 1, a requirement for quickly switching channels may arise in the situation where an STA, such as $STA_4$, for example, may experience interference from a nearby non-802.11-compliant device belonging to other primary users such as satellites and radar systems. To this end, the present invention introduces a modification to the 802.11-MAC specification that would enable a rapid response to the detected interference by transitioning from a current channel to a new channel in a time period specified in microseconds, independent of the beacon interval. It is noted that channel switching in accordance with the present invention overcomes a constraint of the prior art whereby in the prior art switching must occur over some number of beacon interval periods and only at the boundaries of the beacon intervals.

A modification to the 802.11-MAC specification that would enable a rapid transition from a current channel to a new channel for the operation of the network is now described.

In operation, in the "fast" mode, upon detecting interference in a current channel of operation, the AP broadcasts the CSAE 31 to the STAs in the network, with the "switch mode" bit-field corresponding to the "fast" mode set, i.e., 1. Upon receiving the CSAE 31 at the STAs, the "fast" mode of operation is detected and the "channel switch count" field is interpreted as a countdown time (in microseconds), which is a time that is counted down at each STA for switching from a current channel to the announced channel. The channel-switch count time is counted down from the point at which the end of the MPDU (MAC protocol data unit) carrying the CSAE 31 is detected at the STA (see Point "A"). It should be noted that the countdown time for switching channels in accordance with the present embodiment is independent of the beacon interval period. It is further noted that frame exchanges are allowed to continue in the current channel until the expiration of the "channel switch count" time. That is, quieting in the current channel is not performed upon receipt of the CSAE 31. Instead, quieting in the current channel occurs instead after the expiration of the countdown time.

In a further embodiment, a "quiet" mode of operation is described which is distinct from the previous "fast" embodiment in two respects. First, in the present mode, the quieting in the current channel is performed upon receipt of the CSAE 31. A first point of distinction between the two embodiments is that, in the present embodiment, there is no countdown time to wait for quieting the channel; it is substantially immediate, as will be described below. In further contrast to the previous embodiment, the channel switch may occur over a period of several beacon intervals. That is, it is not substantially immediate, as is true in the previous embodiment. This longer channel-switch time may be desirable for reasons including: (1) scanning all the control channels in operation in the WLAN to find the "best" control channel. When a control channel with good-reception quality is found, the WLAN can choose to switch to that channel and (2) certain STAs in the network may be in a power-saving mode, and therefore not available to be switched immediately to a new channel.

In operation, in the "quiet" mode, upon detecting interference in a current channel of operation (i.e., from a primary user), the AP broadcasts the CSAE 31 to the STAs in the network with the "switch mode" bit field corresponding to the "quiet" mode set, i.e., bit 1 of FIG. 3b. Upon receiving the CSAE 31 at the STAs, the "quiet" mode of operation is detected and the "channel switch count" field is interpreted as a countdown time (in microseconds or beacon intervals depending on the setting of bit 0), which is a time that is counted down at each STA for switching to a new channel. In contrast to the previous embodiment, the countdown time may be in the order of several beacon intervals. This distinction is due to the fact that the present embodiment is directed primarily to quickly quieting the channel and allowing a channel switch to occur at a later time.

To quickly quiet the current channel, an end of the received CSAE 31 is detected at the STAs. At a point in time coincident with the detection of the end of the CSAE 31, no new frame-exchange sequences are allowed in the current channel. STAs are allowed only to start transmitting further frame-exchange sequences in the announced channel only after the channel-switch count time has expired. In other words, further transmissions are allowed only in the announced channel after the expiration of the channel-switch count time. Furthermore, in a BSS network, a STA shall wait to hear a beacon or a probe response from the AP before transmitting any Class 2 or Class 3 frames.

In another embodiment a "repeat" mode of operation is described. This mode is described now with reference to the network of FIG. 1. The "repeat" mode is an enhancement to the "quiet" mode described above as it accounts for the possibility that one or more of the STAs, i.e., $STA_1$, may not hear the CSAE 31 broadcast by the source node, i.e., $AP_1$, to quiet the channel. When this occurs, the $STA_1$, which does not hear the CSAE 31 broadcast by $AP_1$, will continue to transmit MAC frames in the current channel thus defeating the objective of quieting the channel. To prevent these MAC-frame transmissions from being transmitted, any other STA, i.e., ($STA_2$, $STA_3$) that does hear the initially broadcast CSAE 31 from the source node $AP_1$, and which also receives subsequently a MAC frame from an $STA_1$, is permitted to re-broadcast the CSAE 31 one time before the announced channel-switch time expires. For example, assuming that $STA_2$ and $STA_3$ hear the originally broadcast CSAE 31 from the source node $AP_1$, both $STA_2$ and $STA_3$ would attempt to re-broadcast the CSAE 31. However, prior to re-broadcasting the CSAE 31, both $STA_2$ and $STA_3$ shall wait for a random back-off interval as performed in accordance with the IEEE 802.11 standard. During the back-off time, the STA having the shorter random back-off interval, e.g., $STA_2$, will re-broadcast the CSAE 31 and the other STAs, e.g., $STA_3$, upon hearing the re-broadcast will halt their transmissions. In this manner, it is hoped that the CSAE 31 re-broadcasted from $STA_2$ will be heard by $STA_1$, now.

As is apparent from the foregoing, the present invention has an advantage in that interference with primary users in the band is minimized or completely eliminated by employing one of the modes of operation described above, i.e., by either quickly quieting the channel or by quickly switching to a new channel. It should be noted that the previous description of the preferred embodiments is provided to enable any person skilled in the art to make or use the present invention. The various modifications to these embodiments will be readily apparent to those skilled in the art, as well as other embodiments, without the use of the inventive faculty. Thus, the present invention is not intended to be limited to the embodiments shown herein but is to be accorded the widest scope consistent with the principles and novel features disclosed herein.

What is claimed is:

1. A method for switching at least two wireless nodes of a plurality of wireless nodes, located within the coverage area of a basic-service set (BSS1) or infrastructure basic-service set (IBSS) in a wireless-local-area network (WLAN), from a first communication channel to a second communication channel, the method comprising the steps of:

(a) determining whether said second communication channel to be used by said at least two wireless nodes is needed;

(b) broadcasting, by a source node, a management frame including a channel switch announcement element (CSAE) to said at least two wireless nodes when it is determined in step (a) that said second communication channel is needed, said CSAE including at least a channel-switch time and a second communication channel identifier;

(c) switching, at said at least two wireless nodes receiving said management frame including said CSAE, from said first communication channel to second communication channel within a countdown time corresponding to said channel-switch time, wherein said channel-switch time is specified in microseconds independent of a beacon interval;

(d) determining, in a second node of said at least two wireless nodes, that said management frame including said CSAE was not received by a first node of said at least two wireless nodes; and (e) re-transmitting, in dependence on said determination, said management frame including said CSAE from said second node of said at least two wireless nodes that received said management frame including said CSAE.

2. The method as claimed in claim 1, wherein said step (c) of switching said at least to wireless nodes further comprises the step of:

detecting the end of the received management frame at each of said at least two wireless nodes to initiate a countdown of said channel-switch time.

3. The method as claimed in claim 1, wherein said source node is selected from the group consisting of:

an access point (AP1) located in a coverage area of said BSS and a station (STA) located in a coverage area of said IBSS.

4. The method as claimed in claim 1, wherein said step (a) of determining whether said second communication channel is needed uses a criteria selected from the group consisting of: interference to the channel quality in said first communication channel or meeting other regulatory requirements.

5. The method as claimed in claim 1, wherein said method further comnprises the step of:

allowing frame exchanges to continue in said first communication channel prior to the expiration of said channel-switch time.

6. A method for switching at least two wireless nodes of a plurality of wireless nodes, located within the coverage area of a basic-service set (BSS1) or infrastructure-basic-service set (IBSS), in a wireless-local-area network (WLAN) from a first communication channel to a second communication channel, the method comprising the steps of:

(a) determining whether said second communication channel to be used by said at least two wireless nodes is needed;

(b) broadcasting, by a source node, a first management frame including a channel switch announcement element (CSAE) to said at least two wireless nodes when it is determined in step (a) that said second communication channel is needed, said first management frame including said CSAE including a channel-switch time and a second communication channel identifier;

(c) upon receiving said broadcasted first management frame including said CSAE at said at least two wireless nodes, halting all further frame exchanges in said first communication channel to quiet said first communication channel during the duration of the channel-switch time;

(d) determining, in a second node of said at least two wireless nodes, that said first management frame including said CSAE was not received by a first node of said at least two wireless nodes; and (e) re-transmitting, in response to said determination, said first management frame including said CSAE from said second node of said at least two wireless nodes that received said first management frame including said CSAE.

7. The method as claimed in claim 6, wherein the switching step further comprises the step of:

detecting the end of the first management frame including said CSAE, received at each of said at least two wireless nodes to initiate said countdown time.

8. The method as claimed in claim 6, wherein said source node is selected from the group consisting of:
an access point (AP) in said BSS and a STA in said IBSS located within said coverage area.

9. The method as claimed in claim 6, wherein said step (a) of determining whether said second communication channel is needed uses a criteria selected from the group consisting of: interference to the channel quality in said first communication channel or meeting other regulatory requirements.

10. The method as claimed in claim 6, wherein said determining step further comprises the step of:
receiving a second management frame from said at least two wireless nodes receiving said first management frame.

11. A system for switching at least two wireless nodes of a plurality of wireless nodes located within the coverage area of a basic-service set (BSS1) or infrastructure-basic-service set (IBSS) in a wireless-local-area network (WLAN) from a first communication channel to a second communication channel, the system comprising:
means for determining whether said second communication channel to be used by said at least two wireless nodes is needed;
means for broadcasting, by a source node, a management frame including a channel switch announcement element (CSAE) to said at least two wireless nodes when it is determined that said second communication channel is needed, said management frame including said CSAE including a channel-switch time and a second communication channel identifier;
means for switching, at each of said at least two wireless nodes receiving said management frame including said CSAE, from said first communication channel to said second communication channel at the expiration of a countdown time corresponding to said channel-switch time, wherein said channel-switch time is independent of the beacon interval;
means for determining, at a second node of said at least two wireless nodes, that said management frame including said CSAE was not received by a first node of said at least two wireless nodes; and
means for re-transmitting said management frame including said CSAE from the second node of said at least two wireless nodes that received said management frame including said CSAE.

12. The system as claimed in claim 11, wherein said means for switching further comprises:
means for detecting the end of the received management frame at each of said at least two nodes to initiate a countdown of said channel-switch time.

13. A system for switching at least two wireless nodes of a plurality of wireless nodes located within the coverage area of a basic-service set (BSS) or infrastructure-basic-service set (IBSS) in a wireless-local-area network (WLAN) from a first communication channel to a second communication channel, the system comprising:
means for determining whether said second communication channel to be used by said at least two wireless nodes is needed;
means for broadcasting, by a source node, a first management frame including a channel switch announcement element (CSAE) to said at least two wireless nodes when it is determined that said second communication channel is needed, said CSAE including a channel-switch time and a second communication channel identifier;
means for halting all further frame exchanges in said first communication channel to quiet said first communication channel upon receiving said broadcasted first management frame including said CSAE at said at least two wireless nodes;
means for determining, at a second of node of said at least two wireless nodes, that said first management frame including said CSAE was not received by a first node of said at least two wireless nodes; and
means for re-transmitting said first management frame including said CSAE from the second node of said at least two wireless nodes that received said first management frame including said CSAE.

14. The system as claimed in claim 13, wherein said system further comprises:
means for switching from said first communication channel to second communication channel, at each of said at least two wireless nodes receiving said first management frame including said CSAE, within a countdown time corresponding to said channel-switch time, wherein said channel-switch time is at least one beacon interval and is independent of the beacon interval.

* * * * *